April 30, 1963 W. M. TURNER 3,087,992

TELEMETERING DECOMMUTATION SYSTEM

Filed March 10, 1959 3 Sheets-Sheet 1

INVENTOR.
WHEELER M. TURNER
BY Christie Parker & Hale
ATTORNEYS

INVENTOR.
WHEELER M. TURNER
BY Christie, Parker & Hale
ATTORNEYS

TELEMETERING DECOMMUTATION SYSTEM

Filed March 10, 1959 3 Sheets-Sheet 3

INVENTOR.
WHEELER M. TURNER
BY
Christie, Parker & Hale
ATTORNEYS

United States Patent Office 3,087,992
Patented Apr. 30, 1963

3,087,992

TELEMETERING DECOMMUTATION SYSTEM

Wheeler M. Turner, Santa Barbara, Calif., assignor to Arnoux Corporation, Los Angeles, Calif., a corporation of California Filed Mar. 10, 1959, Ser. No. 798,456
13 Claims. (Cl. 179—15)

This invention relates to telemetering equipment, and more particularly, is concerned with a decommutating system for providing automatic channel separation of time-division multiplexed signals which are either pulse-amplitude modulated (PAM) or pulse-duration modulated (PDM).

The use of telemetering to transmit data is well known. Generally telemetering systems use multiplexing for sending information derived from a number of separate sources. In a typical telemetering system, an RF carrier is modulated by a group of subcarriers, each of a different frequency. In turn each of the subcarriers are frequency modulated by a time division multiplex arrangement in order to increase the number of individual data channels available in the system. Time division multiplexing commonly referred to as commutation, provides a series of sampling pulses whose amplitude or time duration may be modulated according to the input information of each of the individual data channels.

At the receiving station, the subcarriers are separated and the pulse modulated information is derived from the particular subcarriers. Automatic channel separation equipment, commonly referred to as decommutation equipment, is provided at the receiving station to separate the pulses into the proper number of output channels in synchronization with the sampling of the several data input channels at the sending station, and to demodulate the separated pulse information on each of the channels for accurately reproducing the several channels of analog information from the sending station. Standards for telemetering systems of this type have been established by the Inter-Range Instrumentation Group (IRIG) and are set forth in IRIG Document No. 103-56, IRIG Secretary, White Sands Proving Grounds, New Mexico.

The present invention relates to decommutation equipment for processing telemetering signals complying with the IRIG telemetry standards and may be used either on pulse amplitude or pulse duration modulated information. While various decommutation circuits have heretofore been devised, such known decommutating systems are not particularly well adapted for decommutating both PDM and PAM signals. It has therefore been necessary to devise conversion equipment for use with such prior known decommutation systems for first converting the signals from PAM to PDM, for example, where it is desired to decommutate PAM signals with equipment designed to decommutate PDM signals. Such conversion equipment involves considerable additional circuitry, adding to the cost and maintenance problem of such equipment as well as its size and its complexity of operation.

One of the features of the present invention is that the same decommutating system can be used for both PAM and PDM signals, with minor circuit changes which can be effected by simple switching. Thus the circuitry of the present invention provides a decommutation system which can be used for both PDM and PAM information which is considerably reduced in size and the amount of equipment required as compared with known decommutation systems of comparable capabilities.

The use of pulse amplitude modulation in telemetering equipment has been largely superseded by pulse duration modulation equipment in recent years, even though pulse amplitude modulation has several advantages due generally to its much more limited bandwidth requirements. The reason has been that PAM systems have been heretofore subject to errors primarily due to drift problems which could not be effectively controlled or compensated. It has been the practice heretofore to establish the zero reference for the decommutation system by the center frequency of the subcarrier oscillator at the transmitter. D.C. amplification was used in the decommutating system to preserve the D.C. level established at the output of the discriminator in the receiver. Any drift in the subcarrier oscillator center frequency, drift of the discriminator D.C. output level, or drift in the direct-coupled amplifiers, has reflected errors in the information as reproduced by the decommutating equipment. These sources of drift are difficult to control and while servo techniques have heretofore been devised to provide compensation for drift, compensation at best is only partial and difficult to achieve.

Another feature of the present invention then is that when operating as a PAM demodulation system, no errors are reflected due to drift of the subcarrier oscillator, center frequency at the transmitter, drift of the discriminator D.C. output level, or drift of the amplifiers. Thus the accuracy and stability of the system on PAM information is far superior to that obtainable in prior known systems, particularly in the absence of any zero and full scale servo control in the decommutating system.

These and other features of the invention are achieved by a decommutating system which, in brief, consists broadly of a timing unit which for PAM input information serves to eliminate noise by integration and pulse shaping of the information pulses, and which also eliminates the effect of pulse width variations. The timing unit for PDM operation likewise acts to eliminate or suppress noise and to convert the pulse width variations of the information pulse to pulse amplitude variations at the output of the timing unit. The output of the timing unit in turn is applied to a series of gating units which separate the information pulses into separate channels and which demodulate the pulse information to provide a plurality of analog output signals.

The timing unit comprises at the input a stable A.C. amplifier which receives the pulse modulated telemetering signals from a suitable receiver with a discriminator for deriving pulse information from the frequency-modulated carrier. The A.C. amplifier rejects the D.C. level of the commutated pulse train from the discriminator.

In PAM operation, the output of the amplifier is applied to a clamper circuit which restores the D.C. level after amplification. The output of the clamper circuit is then heavily integrated to provide noise rejection and coupled to the input of a first gate. The first gate is synchronized with the pulse information so as to be turned on for an accurately controlled period of time in relation to the time of the leading edge of each of the information pulses at the output of the A.C. amplifier. After passing through the first gate, the pulse information is applied to a peak detector, the output of the peak detector applied to a second gate which is turned on for each pulse period during the time interval the first gate is turned off. The output of the second gate provides a succession of noise-free information pulses which are decommutated by the gating units into separate output channels.

In PDM operation, the output of the A.C. amplifier, instead of being applied to the clamper, is applied to pulse shaping circuitry and used to operate the first gate so that the first gate is open for varying periods of time determined by the pulse duration of the information pulses at the output of the A.C. amplifier. At the same time a sawtooth wave, synchronized with the information pulses at the output of the A.C. amplifier, is applied to the input of the clamper to set the proper D.C. level of the sawtooth wave, and the output of the clamper is connected directly to the first gate. The timing unit otherwise is substantially unchanged for PAM or PDM operation.

For a more complete understanding of the invention reference should be made to the accompanying drawings, wherein.

Figure 1:
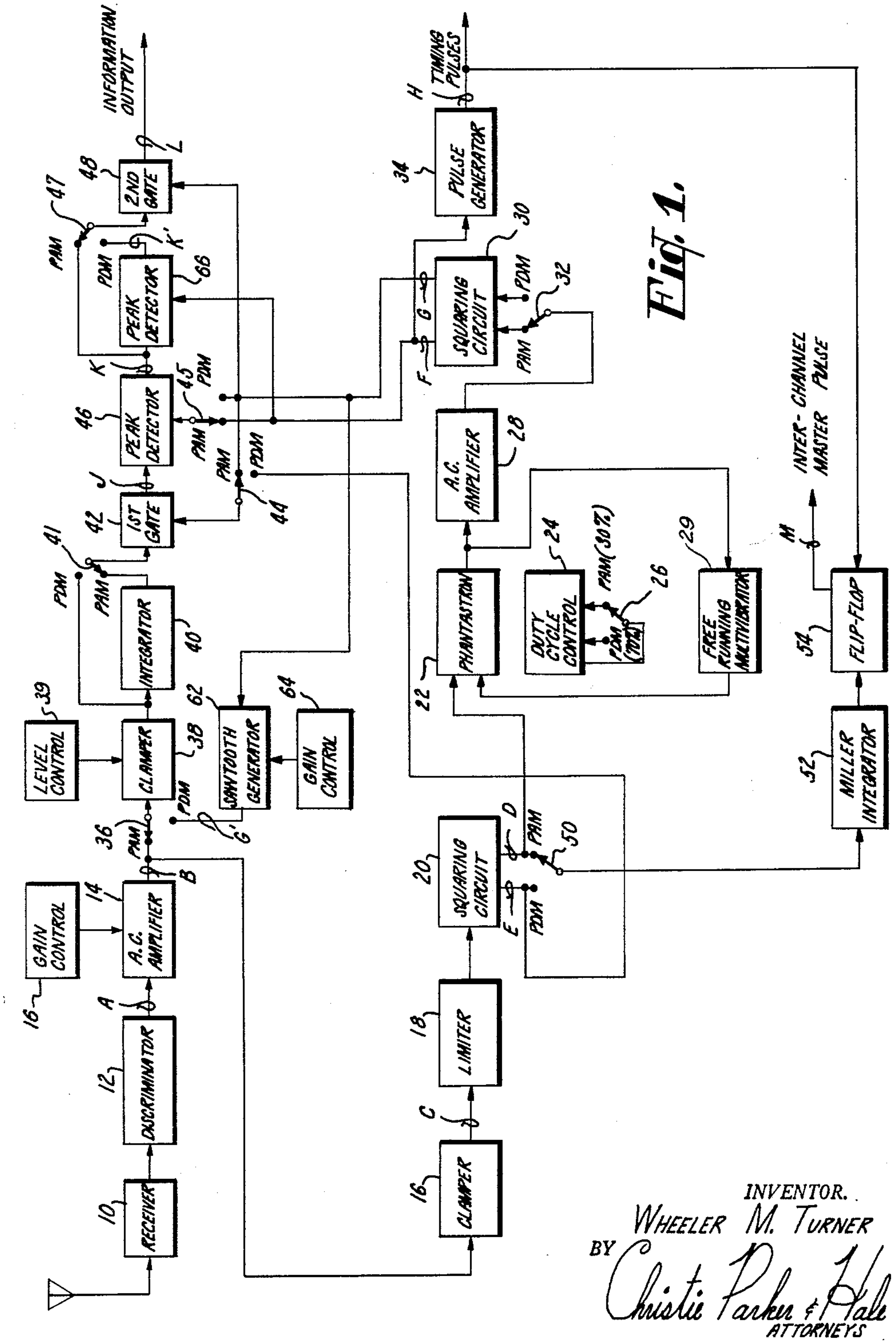
FIG. 1 is a block diagram of the timing unit and associated receiver input.
Figure 3:
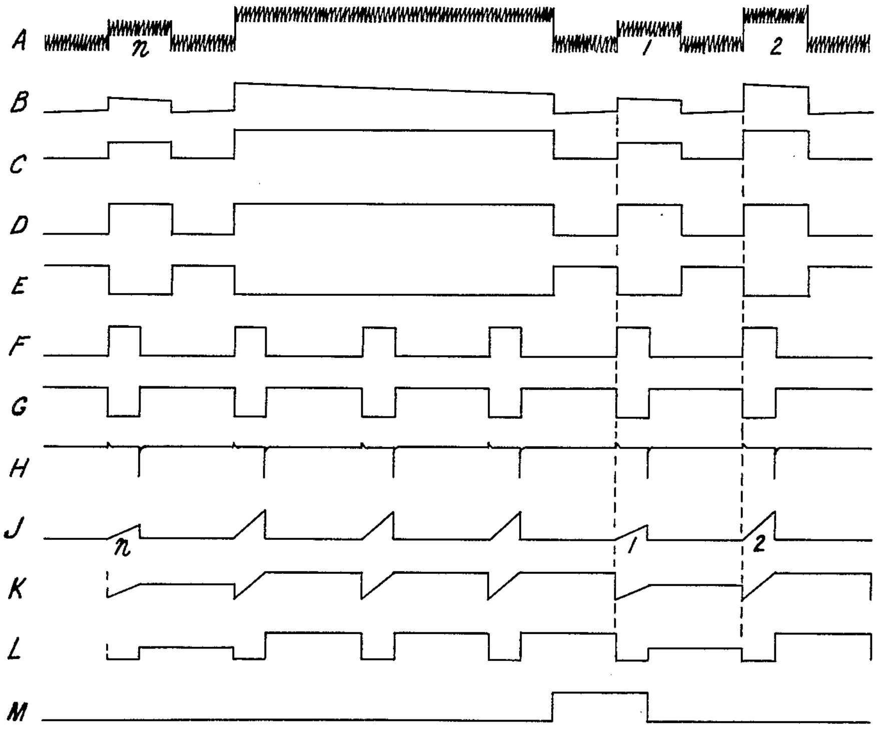
FIG. 3 is a series of waveforms useful in explaining the operation of the timing unit in PAM operation.

Referring to FIG. 1, the numeral 10 indicates generally a conventional receiver, which in the case FM/FM multiplexing operation produces a plurality of subcarrier output signals, only one such subcarrier output being indicated in the drawing. The frequency modulated subcarrier is applied to a conventional discriminator circuit 12. The output of the discriminator 12 is a pulse wave train representing the time shared or commutated information from a remote telemetering station (not shown). By time division multiplexing at the transmitting end, the successive pulses in the pulse train at the output of the discriminator 12 represent the information in a plurality of separate channels. According to the above-mentioned IRIG standards, a long pulse or a long interval between pulses of the wave train identifies the start of a new sampling frame and provides a means of synchronizing the decommutation at the receiver station with the commutation at the transmitting station. A portion of a typical wavetrain for PAM operation as derived from the output of the discriminator 12 is shown in FIG. 3A.

The output of the discriminator is applied to a high gain A.C.-coupled amplifier 14. The amplifier circuit preferably is provided with high negative feedback in order to increase the gain stability of the amplifier. The amplifier 14 is provided wtih a gain control 16 by which the gain of an amplifier 14 can be manually set, or may be controlled automatically if desired by conventional servo control from fullscale reference channel derived from the output of the decommutating system. The use of servo control, however, is not essential to the operation of the system and therefore has not been shown or described in detail. The amplifier 14, being A.C.-coupled with high negative feedback, has high gain stability. The output waveform of the A.C. amplifier is shown in FIG. 3B. It will be noted that the A.C. amplifier rejects the D.C. component of the input signal derived from the discriminator 12.

The output of the A.C. amplifier 14 is applied to a synchronization circuit which includes at its input a clamper circuit 16 which clamps the pulse signal from the amplifier 14 to a fixed D.C. bias level with respect to ground reference. The output of the clamper circuit 16, the waveform of which is shown in FIG. 3C, is applied to a limiter circuit 18 which limits the peak amplitude of the output of the clamper circuit 16 to a small portion of each pulse, thereby providing substantial noise rejection.

The output of the limiter 18 is applied to a squaring circuit 20 which may be, for example, a Schmidt trigger providing a rectangular wave of large peak-to-peak amplitude and with a fast rise time. The squaring circuit 20 provides two outputs of opposite phase, as shown in FIGS. 3D and 3E respectively.

In order to derive gating pulses of constant width, the one output of the squaring circuit 20 having the waveform as shown in FIG. 3D is applied to a phantastron circuit 22 having a controlled duty cycle as established by the duty cycle control circuit 24. Phantastron 22 is triggered in response to the rising or leading edges of the rectangular wave applied thereto. It will be noted that the leading edges of the rectangular wave applied to the phantastron 22 are coincident in time with the leading edges of the information pulses derived from the A.C. amplifier 14. The duty cycle control circuit 24 is arranged, for PAM operation, to cut off the phantastron 22 after an interval corresponding to approximately 30% of the pulse repetition period of the input information. A switch 26, having a PAM and a PDM position, is arranged to set the time constant of the duty cycle control 24 to provide the desired pulse width at the output of the phantastron 22 for PAM gating operation. The function of the phantastron 22 is to provide pulses of constant width whose leading edges are synchronized with the leading edges of the information pulses derived from the A.C. amplifier 14 in the manner described. The use of a phantastron with duty cycle control is well-known for generating pulses of controllable width.

A free running multivibrator 29, or other type of pulse generator, is coupled to the input of the phantastron to produce output pulses in the absence of a signal from the squaring circuit. The multivibrator 29 has a natural frequency slightly lower than the pulse repetition frequency of the information signal. Thus, in the case of the long pulse interval between sampling frames, or in the case of missing pulses, the phantastron 22 continues to generate output pulses. The multivibrator 29 is normally synchronized with the output of the phantastron 22.

The constant width pulses at the output of the phantastron 22 are amplified by a suitable A.C. amplifier 28 and applied to a squaring circuit 30 through a switch 32. The function of the switch 32 is to connect the pulses to one side or the other of the squaring circuit 30, which again may be a Schmidt trigger, so as to reverse the phase of the signals at the two outputs of the squaring circuit for PAM and PDM operation respectively. With the switch 32 set for PAM operation, the waveforms of the squaring circuit 30 at the two outputs are shown respectively in FIGS. 3F and 3G.

One output of the squaring circuit 30 is applied to a pulse generator 34 which is preferably a differentiating and clipping circuit for deriving negative pulses in synchronism with the trailing edge of the falling or trailing edges of the rectangular wave from the squaring circuit 30. The waveform of the timing pulses is shown in FIG. 3H. Timing pulses are utilized as hereinafter described to sequence the output gating units.

In order to derive amplitude information from the output pulses from the A.C. amplifier 14 and at the same time eliminate noise and the effect of pulse-width variations, the information pulses in PAM operation are connected through a switch 36 to a D.C. level clamper circuit 38, which may be a conventional diode clamper that restores the proper D.C. level to the pulse information. The D.C. level is made adjustable, the level control 39 being used to calibrate the system to produce zero output in response to pulses representing a zero level input at the transmitter. If desired, the level control can be made automatic and controlled by a servo responsive to a zero reference channel transmitted from the sending station. The use of servo control, however, is not essential to the operation of the system.

With the D.C. level restored by the clamper circuit 38, which has an output waveform similar to that shown in FIG. 3C, the information signal is applied to an integrator circuit 40. The function of the integrator circuit 40 is to eliminate any noise effects on the signal and permit detection of the pulses. The effect of the integrator is to produce a slowly rising leading edge to the pulses, with the rate of rise of the leading edge being a function of the amplitude of the pulse applied to the integrator.

The heavily integrated pulses are applied to a first gate 42 through a switch 41 set for PAM operation. The gate 42 is also connected, during PAM operation, through a switch 44 to one output of the squaring circuit 30. Thus, a gating voltage of the waveform shown in FIG. 3G is applied to the first gate 42, opening the gate during the positive-going portion of the applied rectangular wave. Thus, the first gate 42 is closed to provide a high impedance in coincidence with the leading edge of the information pulses as derived from the A.C. amplifier 14 and is held closed for 30% of the pulse interval as determined by the pulse width from the phantastron 22. The gating circuit is arranged to shunt the output of the integrator, so that during the time the first gate 42 is closed, the output from the integrator is not shunted by a low impedance but provides rising voltages. The peak amplitude to which it rises during the time the gate 42 is closed is proportional to the amplitude of the information pulse. The gate circuit 42, during the time it is biased open, provides a low impedance discharge path for the integrator network of the integrator circuit 40. Thus, every time the rfirst gate 42 is closed, the integrator begins charging from the same level. The resulting waveform at the output of the first gate 42 is shown in FIG. 3J.

The resulting sawtooth wave produced at the output of the first gate 42 is applied to a recycling type of peak detector circuit 46. The peak detector 46 is preferably of a type described in copending application Serial No. 798,458, filed March 10, 1959, in the name of the present inventor and assigned to the same assigneee. The peak detector 46 is recycled in synchronism with the negative-going portion of the rectangular wave derived from the squaring circuit 30 through a switch 45 set for PAM operation. The recycling signal has the waveform shown in FIG. 3G. Thus, the peak detector 46 is recycled synchronously with the leading edge of the information pulses derived from the A.C. amplifier 14. The peak detector 46 maintains a peak amplitude for each one of the sawtooth pulses derived from the output of the first gate 42 for the duration of the information period. The resulting output signal from the peak detector 46 is shown by the waveform in FIG. 3K.

The output of the peak detector 46 is preferably applied to a second gate 48 through a switch 47 set for PAM operation. The second gate 48 is controlled by the same output of the squaring circuit 30 as controls the first gate 42, but the second gate is in series-connection rather than shunt, and so provides an output during the positive portion of the square wave of FIG. 3G. The second gate 48 is open during the portion of a cycle in which the first gate 42 is open. Thus, the second gate 48 is open during the time the output of the peak detector has risen to its constant output level. As a result the output signal from the second gate 48 is a series of positive pulses having a base level which is clamped with respect to ground and with the relative amplitudes of the pulses fixed by the amplitudes of the received information pulses. It will be noted that the pulses derived from the output of the second gate 48 are free of noise with sharp leading and trailing edges.

Figure 2:
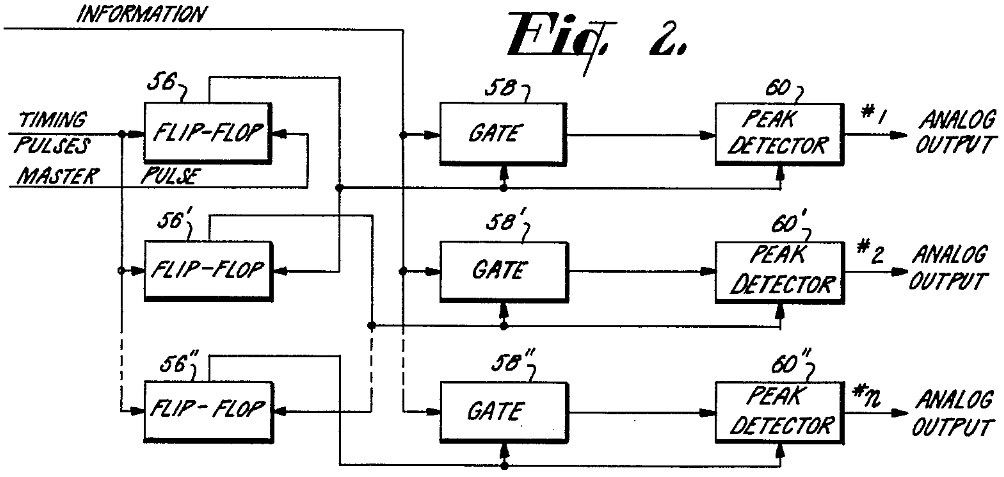
FIG. 2 is a block diagram of the gating unit.

The regenerated pulse information from the ouput of the second gate 48 is applied to a plurality of gating units as shown in FIG. 2 for separating the time-shared information pulses into separate output channels. However, in order to synchronize the output channels with the commutated input channels at the sending station, a synchronizing master pulse must be generated. This is derived from the long framing pulse present in the information pulse train, as mentioned above.

As shown in FIG. 1, to derive a frame synchronizing pulse, the output of the squaring circuit 20 is applied through a switch 50 set for PAM operation to a Miller integrator circuit 52. For PAM operation, the waveform applied to the Miller integrator 52 is that shown in FIG. 3D. Only during the long pulse is the output of the Miller integrator built up sufficiently to trigger a flip-flop 54. The trigger pulse applied to the flip-flop is derived from the trailing edge of the sawtooth pulse generated by the Miller integrator. The flip-flop 54 is immediately reset by the next timing pulse from the output of the pulse generator 34. As a result a master pulse is produced by the flip-flop 54, whose trailing edge is synchronized with the first timing pulse following the frame-synchronizing long pulse. The waveform of the master pulse is shown in FIG. 3M.

The gating units as shown in FIG. 2 each include a bistable multivibrator flip-flop 56. Since each of the gating units is identical, the various corresponding circuits are indicated by primes and double-primes in the several gating units shown.

The flip-flops 56 are connected in a chain and are arranged to all be set to an initial condition by the timing pulses derived from the pulse generator 34. The master pulse is applied to the first flip-flop 56 which is then reset by the next timing pulse following the termination of the master pulse. When the flip-flop 56 is reset by the timing pulse, it in turn sets the next flip-flop 56' in the chain. Thus each of the flip-flops is successively set for an interval corresponding to the time between successive timing pulses and then reset. Each of the flip-flops controls a gate 58 to which the information pulses from the second gate 48 are simultaneously applied. As the flip-flops in the chain are successively actuated, the gates 58 are successively opened to pass successive pulses in the series of pulses derived from the second gate 48. Each of the gates 58 is connected to a recycling peak detector 60 similar to the peak detector 46 described above in connection with FIG. 1. The peak detectors are recycled by the leading edge of the pulse applied to the associated gate. Thus each of the peak detectors is recycled at the master pulse rate, but delayed by successive intervals equal to the timing pulse intervals. The peak detector maintains the level set by the peak pulse amplitude between recycling intervals. Thus a substantially analog output is derived from each of the peak detectors, which outputs can be applied to galvanometers, pen recorders, meters, and the like for indicating changes in the measured quantities at the central station.

Figure 4:
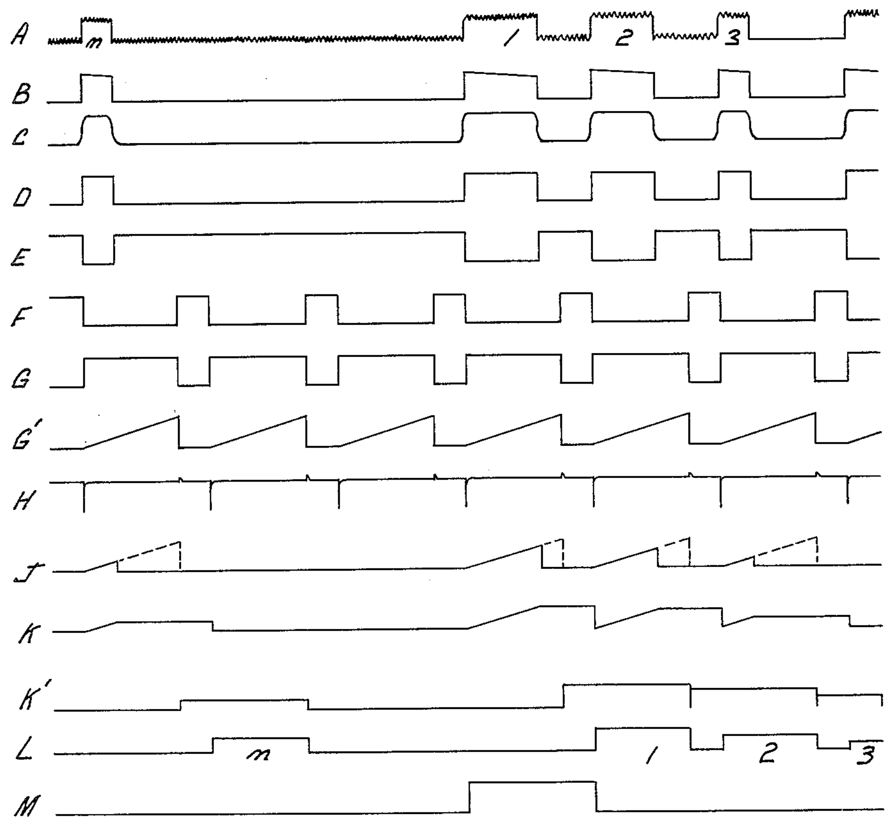
FIG. 4 is a series of waveforms useful in explaining the operation of the timing unit in PDM operation.

As mentioned above, the timing unit of FIG. 1 can be used for decommutating PDM information as well as PAM information. To operate on PDM information, all of the several switches shown in FIG. 1 are reversed from their positions shown in the figure. This effects the following changes in the operation of the circuit of FIG. 1:

In PDM operation, the input of the A.C. amplifier 14 has a waveform as shown in FIG. 4A, conforming to IRIG standards. After A.C. amplification, the signal has a waveform as shown in FIG. 4B. This signal is not applied to the clamper 38 since the switch in the PDM condition breaks the circuit between the A.C. amplifier 14 and the clamper 38. However, this signal is applied to the clamper 16 to restore the desired D.C. bias level and the limiter 18 slices out a portion of the PDM signal to provide the timing pulses. The limiter circuit permits selection of approximately 2% of the peak-to-peak pulse amplitude at the very middle of each pulse at the output of the A.C. amplifier 14. Thus heavy sloping of the information pulses due to bandwidth limitations in the system does not adversely affect the pulse width as derived at the output of the limiter 18. Thus, pulse width information is preserved and noise and distortion effects are eliminated from the pulse signal from the output of the limiter 18.

As in the case of PAM operation, the output of the limiter is applied to the squaring circuit 20 to provide increased pulse magnitude and with fast rise time. One output from the squaring circuit 20, the waveform of which is shown in FIG. 4E, is applied to the first gate 42 through the switch 44. Thus, the first gate 42 is periodically biased open for periods of time corresponding to the time duration of the information pulses derived from the output of the A.C. amplifier 14.

Constant width gating pulses are derived as before by means of the phantastron 22 and applied to the squaring circuit 30. However, the phase of the two rectangular waves derived from the output of the squaring circuit are reversed by reversing the input to the squaring circuit 30 by means of the switch 32. The resulting waveforms of the two outputs of the squaring circuit 30 are shown in FIGS. 4F and 4G. One output from the squaring circuit 30, having the waveform as shown in FIG. 4G, is applied to a "bootstrap" sawtooth generator 62 which may be a conventional bootstrap oscillator circuit which is triggered by the rising or leading edges of the rectangular wave from the squaring cirrcuit 30. Thus, a sawtooth wave is generated in which the start of the rise of the sawtooth pulses is synchronous with the leading edge of each of the information pulses derived from the A.C. amplifier 14. The waveform of the output of the sawtooth generator 62 is shown in FIG. 4G'. The sawtooth generator 62 has a gain control 64 which may be manually set to control the rise rate and hence the peak amplitude of the sawtooth pulse signal. In PDM operation, the gain control 64 may also be controlled automatically by a servo responsive to a full-scale reference channel on the output, if desired. However, because of the stability of the circuit, manual control of the gain is adequate for most purposes. The output of the sawtooth generator 62 is applied through the switch 36 to the input of the clamper 38 which sets the D.C. bias of the base level of the sawtooth wave signal.

The output of the clamper 38 is applied directly through the switch 41 to the peak detector by means of the first gate 42. Thus the peak amplitude to which the output of the first gate rises is determined by the length of time that the first gate 42 is biased open. The resulting waveform at the output of the first gate 42 is shown in FIG. 4J.

As in the PAM system, the output of the first gate 42 is applied to the peak detector 46 which holds the peak amplitude between successive gating intervals of the first gate 42. The resulting waveform at the output of the peak detector 46 for PDM operation is shown in FIG. 4K.

It will be seen that in the waveform as shown in FIG. 4K the peak amplitude intervals held at the output of the recirculating detector 46 vary in duration according to the variations in the duration of the PDM information pulses. In many cases, this time may be too short to provide proper gating at the second gate 48. For this reason, in PDM operation, a second peak detector 66 is provided which is connected by means of the switch 47 between the peak detector 46 and the second gate 48. By recycling the peak detector 66 in response to the opposite phase output from the squaring circuit 30 from the peak detector 46, the second peak detector sustains the peak output from the first peak detector for an additional period of time. The resulting waveform at the output of the peak detector 66 is shown in FIG. 4K'. This signal is applied to the second gate 48. The second gate is biased open by the same signal from the squaring circuit 30 that biases on the sawtooth generator 62. However, because of the double time delay effected through the peak detector 46 and the peak detector 66, the regenerated information pulse at the output of the second gate 48 is delayed a whole pulse interval from the PDM information pulse from which it was derived at the output of the A.C. amplifier 14. This is shown by the waveform of FIG. 4L.

The master pulse is derived substantially the same way as described above in connection with PAM operation. According to IRIG standards, the frame synchronization is provided by leaving two extra pulse spaces between the last information pulse of one frame and the first information pulse of the next frame. By means of the switch 50 connected to the output of the squaring circuit 20, the opposite phase is connected to the Miller integrator 52. The long space between successive pulses therefore looks substantially identical to the long pulse applied to the Miller integrator in the case of PAM operation. As before, the Miller integrator 52 responds to this long pulse to actuate the multivibrator 54 and initiate a master pulse. Because of the phase reversal by the switch 32, the timing pulses from the pulse generator 34, as shown in FIG. 4H, are coincident with the leading edges of the information pulses. Thus the multivibrator 54 is reset in time coincidence with the leading edge of the second information pulse. Since the gate 58 of the first gating unit is not closed until the next timing pulse following the termination of the master pulse, i.e., until the occurrence of the leading edge of the third PDM information pulse at the output of the AC amplifier 14, the gate 58 is opened at the proper time to pass the first regenerated information pulse at the output of the second gate 48. Thus the circuit of FIG. 1 automatically provides the proper delay which the operation of the gating units require due to the delay introduced by the additional peak detector 66 in PDM operation.

From the above description, it will be recognized that the circuit of the present invention provides a decommutating system which operates effectively on both PAM and PDM telemetering signals The circuit provides for noise rejection before dividing the time shared information into separate channels Thus noise rejection circuitry need not be duplicated for each of the information channels of the system. Pulses are regenerated to eliminate the effects of noise and distortion while the information is in serial pulse form.

In a PAM commutating system, the output is free of level drift as a function of subcarrier oscillator center frequency drift or of discriminator level drift, a problem which has heretofore plagued PAM decommutating systems. The D.C. level of the commutated pulse train is rejected at the input and all amplification is accomplished with a single stable A.C.-coupled amplifier. Since all information amplification is accomplished with a single high gain A.C. amplifier, a very stable system output is possible.

Furthermore, increased synchronization stability is also achieved. Pulse decommutation systems in general rely on the ability to clip out a small portion of the incoming pulse train to derive a noise-free synchronizing square-wave. However, since the portion of the train to be clipped out is established according to the D.C. level of the signal, level drift in the system results in a different portion of the train being clipped out. As a result such systems are more susceptible to noise than may be present on either the zero volt information samples or the bottom of the pulse train. It will be recognized that in the above described circuit, however, the level of the pulse train to be clipped is established by the clamping circuit 16 and therefore is not subject to system drift. Therefore the portion of the signal derived from the output of the limiter 18 remains at all times at the optimum operating point.

All of the circuits set out in block form in FIGS. 1 and 2, with the exception of the recycling peak detector, are standard circuits and can be found described, for example, in the book "Waveforms," vol. 19, Radiation Laboratories Series, McGraw-Hill Book Co., 1949. Further detailed description of these circuits is therefore not considered necessary or desirable.

What is claimed is:

1. A decommutating system for pulse modulated telemetering signals comprising an A.C.-coupled amplifier to which the telemetering signals are applied for rejecting the D.C. component of the telemetering signals and amplifying the A.C. component of the signals, level clamping means coupled to the output of the amplifier for restoring a D.C. level to the telemetering signals with respect to ground reference, means for integrating the output of the D.C. level restorer means, a recycling peak detector, a first gating circuit for coupling the output of the integrator to the peak detector, a second gating circuit, means responsive to the telemetering signals from the amplifier for generating a rectangular wave synchronized with the leading edges of the telemetering signal pulses, whereby the rectangular wave has the same period as the pulses in the telemetering signals, means for actuating the first and second gates alternately in response to the rectangular wave, and means coupled to the output of the second gate for gating successive pulses passed by the second gate to a plurality of output channels in predetermined order.

2. Apparatus as defined in claim 1 further including a sawtooth generator, means for synchronizing the sawtooth generator with said rectangular wave, switching means for selectively coupling the input to the D.C. restorer means to the output of the amplifier or the output of the sawtooth generator, means for generating a plurality of gating pulses in synchronism with the telemetering signal pulses from the amplifier, the gating pulses having the same pulse duration as the synchronizing telemetering pulses, and means for selectively connecting the first gating circuit to the rectangular wave generating means or the gating pulse generating means, whereby the decommutating system may be set to decommutate either pulse amplitude modulated signals or pulse duration modulated signals.

3. A system for regenerating pulse amplitude modulated signals comprising means for amplifying the alternating current components of the pulse modulated signals and rejecting any direct current component, means for restoring variable direct current component to the amplified alternating current components of the pulse modulated signals, means for integrating the output signal from the direct current component restoring means, a peak amplitude detector, means for gating the output of the integrating means to the peak amplitude detector, an output circuit, means including second gating means for coupling the output of the first peak detector to the output circuit, and means synchronized with the pulses of the pulse modulated signals for alternately actuating the first and second gating means to provide an output signal from the first gating means and an output signal from the second gating means during separate first and second portions respectively of each pulse period of the pulse modulated signal, said last-named means including means for setting the ratio of time durations of the first and second portions of the pulse period during which the respective gating means are actuated to substantially less than unity.

4. A system for regenerating pulse amplitude modulated signals comprising means for amplifying the alternating current components of the pulse modulated signals and rejecting any direct current component, means for restoring an adjustable direct current component to the amplified alternating current components of the pulse modulated signals, means for integrating the output signal from the direct current component restoring means, a peak amplitude detector, means for gating the output of the integrating means to the peak amplitude detector, an output circuit, means including second gating means for coupling the output of the first peak detector to the output circuit, and means synchronized with the pulses of the pulse modulated signals for alternately actuating the first and second gating means to provide an output signal from the first gating means and an output signal from the second gating means during separate first and second portions respectively of each pulse period of the pulse modulated signal.

5. A system for regenerating pulse amplitude modulated signals comprising means for amplifying the alternating current components of the pulse modulated signals and rejecting any direct current component, means for restoring an adjustable direct current component to the amplified alternating current components of the pulse modulated signals, means for integrating the output signal from the direct current component restoring means, a peak amplitude detector, means for gating the output of the integrating means to the peak amplitude detector, an output circuit, means for coupling the output of the first peak detector to the output circuit, and means synchronized with the pulses of the pulse modulated signals for actuating the first gating means in response to each of the pulses of the pulse modulated signal.

6. A system for regenerating pulse amplitude modulated signals comprising means for amplifying the alternating current components of the pulse modulated signals and rejecting any direct current component, means for restoring an adjustable direct current component to the amplified alternating current components of the pulse modulated signals, means for integrating the output signal from the direct current component restoring means, a peak amplitude detector, means for gating the output of the integrating means to the peak amplitude detector, and means synchronized with the pulses of the pulse modulated signals for actuating the gating means in response to each of the pulses of the pulse modulated signal.

7. Apparatus for demodulating pulse amplitude or pulse duration modulated information signals comprising means for amplifying the alternating current component of the modulated signals and rejecting the direct current component, means responsive to the amplified alternating current component for generating squared pulses having the same duration as the information pulses, means synchronized with the leading edges of the squared pulses for generating gating pulses of constant duration, a sawtooth wave generator gated on by said gating pulses for generating sawtooth pulses of constant duration, adjustable direct current level clamping means, means for selectively connecting the output of the amplifying means or the sawtooth wave generating means to the input of the level clamping means, a peak detector, means including a first gate for coupling the output of the level clamping means to the first peak detector, means for selectively connecting the first gate to the constant duration gating pulse means or the squared pulse generating means for actuating the first gate, and means including a second gate coupled to the output of the peak detector for producing an output signal in the form of a train of pulses whose amplitudes vary as a function of the pulse modulated input information signals, the second gate being controlled by the output of said constant duration pulse generating means.

8. Apparatus as defined in claim 7 further including a second peak detector, means for connecting the second peak detector to the output of the first peak detector, and means for selectively connecting the input to the second gate to the output of the first peak detector or the output of the second peak detector.

9. Apparatus for demodulating pulse duration modulated information signals comprising means for amplifying the alternating current component of the modulated signals and rejecting the direct current component, means responsive to the amplified alternating current component for generating squared pulses having the same duration as the information pulses, means synchronized with the leading edges of the squared pulses for generating gating pulses of constant duration, a sawtooth wave generator gated on by said gating pulses for generating sawtooth pulses of constant duration, adjustable direct current level clamping means, means for connecting the output of the sawtooth wave generating means to the input of the level clamping means, a peak detector, means including a first gate for coupling the output of the level clamping means to the first peak detector, means for connecting the first gate to the squared pulse generating means for actuating the first gate, and means including a second gate coupled to the output of the peak detector for producing an output signal in the form of a train of pulses whose amplitudes vary as a function of the pulse modulated input information signals, the second gate being controlled by the output of said constant duration pulse generating means.

10. Apparatus as defined in claim 9 further including a second peak detector, means for connecting the second peak detector to the output of the first peak detector, and means for connecting the input to the second gate to the output of the second peak detector.

11. A decommutator system for a time shared pulse amplitude modulated signal comprising means for amplifying the alternating current component of the time shared signal and rejecting any direct current component of the time shared signal, means for clamping the level of the output signal from the amplifying means, means for integrating the output from the level clamping means to produce pulses whose leading edges have a rise rate proportional to the amplitude of the input pulses, means synchronized with the leading edge of the signal pulses at the output of amplifying means for interrupting the output of the integrating means a predetermined constant time interval following the start of each pulse applied to the input thereof, whereby the peak amplitude at the output of the integrator for each input pulse is proportional to the amplitude of the input pulse, a recycling peak detector coupled to the output of the integrating means, means for recycling the first peak detector synchronously with the leading edge of each of the signal pulses at the output of the amplifying means, an additional group of recycling peak detectors, gating means for coupling the output pulses from the first peak detector sequentially to each of the group of peak detectors, and means for recycling each of the additional group of peak detectors at the start of the pulse gated to the particular one of the additional group of peak detectors by the gating means.

12. Apparatus for generating noise-free information pulses of varying amplitude with respect to a reference potential in response to a time shared pulse amplitude modulated signal, said apparatus comprising means for amplifying the alternating current component of the time shared signal and rejecting any direct current component of the time shared signal, means for clamping the level of the output signal from the amplifying means, means for integrating the output from the level clamping means to produce pulses whose leading edges have a rise rate proportional to the amplitude of the input pulses, means synchronized with the leading edge of the signal pulses at the output of amplifying means for interrupting the output of the integrating means a predetermined constant time interval following the start of each pulse applied to the input thereof, whereby the peak amplitude at the output of the integrator for each input pulse is proportional to the amplitude of the input pulse, a recycling peak detector coupled to the output of the integrating means, and means for recycling the peak detector synchronously with the leading edge of each of the signal pulses at the output of the amplifying means.

13. Apparatus for generating noise-free information pulses of varying amplitude with respect to a reference potential in response to a time shared pulse amplitude modulated signal, comprising means for producing time shared pulse amplitude modulated signals, means for integrating each of the pulses of the time shared pulse amplitude modulated signal to produce pulses whose leading edges have a rise rate proportional to the amplitude of the input pulses, means for interrupting the output of the integrating means, means for controlling the interrupting means in response to the leading edges of the pulse amplitude modulated signal, the controlling means including means for controlling the interrupting means such that the output of the integrating means is interrupted, a predetermined constant time interval following the start of each pulse applied to the input thereof, whereby the peak amplitude at the output of the integrator for each input pulse is proportional to the amplitude of the input pulse, a recycling peak detector coupled to the output of the integrating means, and means for recycling the peak detector synchronously with the leading edges of the pulse amplitude modulated signal.

References Cited in the file of this patent

UNITED STATES PATENTS

| | | |
|---|---|---|
| 2,445,840 | Rauch | July 27, 1948 |
| 2,469,066 | Day | May 3, 1949 |
| 2,632,053 | Volz | Mar. 17, 1953 |
| 2,632,147 | Mohr | Mar. 17, 1953 |
| 2,816,959 | Segerstrom et al. | Dec. 17, 1957 |
| 2,844,652 | Pinet | July 22, 1958 |
| 2,878,316 | Boothroyd | Mar. 17, 1959 |
| 2,885,662 | Hansen | May 5, 1959 |